United States Patent
Joseph et al.

(10) Patent No.: US 9,165,603 B2
(45) Date of Patent: Oct. 20, 2015

(54) METHOD AND APPARATUS FOR GROUPING VIDEO TRACKS IN A VIDEO EDITING TIMELINE

(75) Inventors: Jose Joseph, Bangalore (IN); Arvinder Singh, New Delhi (IN)

(73) Assignee: ADOBE SYSTEMS INCORPORATED, San Jose, CA (US)

(*) Notice: Subject to any disclaimer, the term of this patent is extended or adjusted under 35 U.S.C. 154(b) by 198 days.

(21) Appl. No.: 13/433,732

(22) Filed: Mar. 29, 2012

(65) Prior Publication Data

US 2013/0263003 A1  Oct. 3, 2013

(51) Int. Cl.
*G06F 3/0484* (2013.01)
*G11B 27/034* (2006.01)
*G11B 27/34* (2006.01)

(52) U.S. Cl.
CPC ............. *G11B 27/034* (2013.01); *G11B 27/34* (2013.01)

(58) Field of Classification Search
CPC ......... G11B 27/02; G11B 27/10; G11B 31/00
USPC ......................................... 715/723, 716, 719
See application file for complete search history.

(56) References Cited

U.S. PATENT DOCUMENTS

| | | | |
|---|---|---|---|
| 7,805,678 B1* | 9/2010 | Niles et al. | 715/716 |
| 2001/0036356 A1* | 11/2001 | Weaver et al. | 386/52 |
| 2006/0224940 A1* | 10/2006 | Lee | 715/500.1 |
| 2009/0106310 A1* | 4/2009 | Lanza et al. | 707/103 Y |
| 2010/0153395 A1* | 6/2010 | Hannuksela et al. | 707/737 |
| 2010/0278504 A1* | 11/2010 | Lyons et al. | 386/52 |
| 2010/0281377 A1* | 11/2010 | Meaney et al. | 715/723 |
| 2010/0281386 A1* | 11/2010 | Lyons et al. | 715/731 |
| 2012/0210228 A1* | 8/2012 | Wang et al. | 715/723 |
| 2013/0124990 A1* | 5/2013 | Lettau | 715/716 |
| 2013/0124996 A1* | 5/2013 | Margulis | 715/719 |

* cited by examiner

*Primary Examiner* — Tadeese Hailu
(74) *Attorney, Agent, or Firm* — Keller Jolley Preece

(57) ABSTRACT

A method and apparatus for grouping video tracks in a video editing timeline comprises displaying a plurality of video tracks in a video editing timeline; receiving a selection of video tracks to be grouped from the plurality of video tracks that are displayed; displaying the video tracks selected for grouping as a single video track in the video editing timeline; and applying an indicator identifying the video tracks as grouped in the video editing timeline.

20 Claims, 4 Drawing Sheets

METHOD AND APPARATUS FOR GROUPING VIDEO TRACKS IN A VIDEO EDITING TIMELINE

BACKGROUND OF THE INVENTION

1. Field of the Invention

Embodiments of the present invention generally relate to digital media editing and related techniques, and more particularly, to a method and apparatus for grouping video tracks in a video editing timeline.

2. Description of the Related Art

Video editing is a common task for many camera users. In order to edit video, audio clips and video clips are arranged in tracks in a video editing timeline. Music and graphics may be added and special effects may be created. These music and graphics clips are displayed in tracks on the timeline. When creating a video project, multiple clips are edited together in tracks on the timeline to play in a user specified sequence with transitions between clips and other added effects.

One conventional approach to video editing involves inputting multiple audio and video clips into the video editor and previewing them by scrolling up and down in the video editor to selectively view a specific track containing a particular clip. When there are multiple audio and video clips being incorporated into a sequence, video editing becomes difficult to manage. As a result, the conventional techniques are unable to provide user-friendly video editing solutions.

Therefore, there is a need for a method and apparatus for grouping video tracks in a video editing timeline.

SUMMARY OF THE INVENTION

The present invention provides a method and apparatus for grouping video tracks in a video editing timeline. In one embodiment, the method comprises displaying a plurality of video tracks in a video editing timeline. Upon receiving a selection of video tracks to be grouped from the plurality of video tracks, the selected video tracks are grouped and displayed as a single video track in the video editing timeline. The method then applies an indicator identifying the video tracks as grouped in the video editing timeline.

Figure 1:
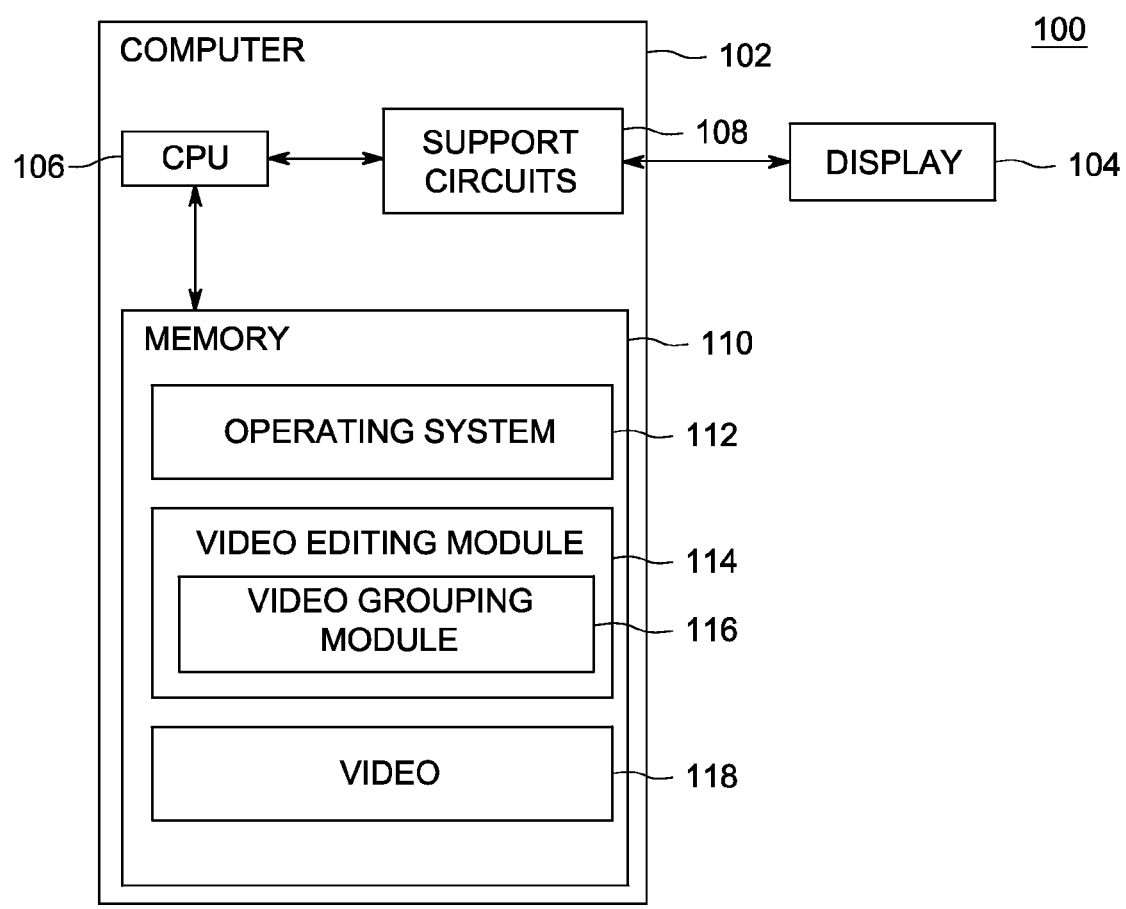
FIG. 1 depicts a system for grouping multiple video tracks into a single track in a user interface, according to one or more embodiments of the invention.

While the method and apparatus is described herein by way of example for several embodiments and illustrative drawings, those skilled in the art will recognize that the method and apparatus for grouping video tracks in a video editing timeline are not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for grouping video tracks in a video editing timeline as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to. Additionally, as used herein, the word "video" refers generally to any multi-media object or data, and although in various embodiments of the invention may refer to only a video object (still, animated or moving), in other embodiments, may refer to a combination of both video and audio objects or an audio object alone.

DETAILED DESCRIPTION OF EMBODIMENTS

Embodiments of the present invention comprise a method and apparatus for grouping video tracks in a video editing timeline. The embodiments enable a user to select multiple tracks in a video editing timeline and have those tracks displayed as a single track. This provides more space to work, e.g., editing video clips. Although the selected tracks are grouped together, they are not merged, so when the user wants to edit the grouped tracks on the video timeline, the tracks can be ungrouped and again displayed individually.

Various embodiments of an apparatus and method for grouping video tracks in a video editing timeline are described. In the following detailed description, numerous specific details are set forth to provide a thorough understanding of the claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Embodiments of the present invention provide a method and apparatus for grouping video tracks in a video editing timeline. Advantageously, embodiments enable a user to get more space on the user interface (UI) for performing various editing activities.

FIG. 1 depicts a system for grouping multiple video tracks into a single track in a user interface (UI), according to one or more embodiments of the invention. The system 100 groups multiple video tracks into a single track in a user interface. The system 100 comprises a computer 102 coupled to a display 104.

The computer 102 comprises a CPU 106, support circuits 108, and a memory 110. The computer 102 is a type of computing device (e.g., a laptop, a desktop, a Personal Digital Assistant (PDA) and/or the like) known to one of ordinary skill in the art. The CPU 106 may comprise one or more commercially available microprocessors or microcontrollers that facilitate data processing and storage. The various support circuits 108 facilitate the operation of the CPU 106 and include one or more clock circuits, power supplies, cache, input/output circuits, displays, and the like. The memory 110 comprises at least one of Read Only Memory (ROM), Random Access Memory (RAM), disk drive storage, optical storage, removable storage and/or the like. The memory 110 comprises an operating system 112, a video editing module 114, and stored video 118. The video editing module 114 comprises, in accordance with embodiments of the invention, a video grouping module 116.

According to some embodiments of the invention, the operating system (OS) 112 generally manages various computer resources (e.g., network resources, file processors, and/or the like). The operating system 112 is configured to execute operations on one or more hardware and/or software modules, such as Network Interface Cards (NICs), hard disks, virtualization layers, firewalls and/or the like. Examples of the operating system 112 may include, but are not limited to, Linux, Mac OSX, BSD, Unix, Microsoft Windows, and the like. The video editing module 114 calls commands associated with the operating system 112 (i.e., native operating system commands) to perform various operations, such as editing of the video and/or the like, as generally performed by known video editing software applications, such as Adobe® Premiere® Elements 10, available from Adobe Systems Incorporated, San Jose, Calif.

According to some embodiments, the video grouping module 116 groups two or more tracks in a video editing timeline and displays them as a single track. In one embodiment, a user selects, in the video editing timeline, the two or more video tracks which the user wants to group. While the two tracks are grouped, they cannot be edited. They are simply layered atop one another in a single track. The video grouping module 116 displays the grouped tracks as a single track in the video timeline on the display 104. By grouping the two or more tracks as a single track, the user has more display space in the video editing timeline to edit video clips in other tracks that remain not grouped in the displayed video timeline.

According to some embodiments, the video grouping module 116 stores track information for each selected track. The track information includes the type of track, i.e., whether the track is a video track or an audio track. The track information also includes a location i.e., the row in the User-Interface (UI) in which the track was located before the track was grouped, as well as an in-point of the track (a selected time point in the timeline where the track begins). The track information is used at a later stage when the merged track is required to be ungrouped. The track information ensures that each video track is paired with the correct audio track and that the video tracks are placed correctly in time within the video editing timeline. In some embodiments, the video editing module 114 displays a header or other means for identifying the track in the timeline as a set of grouped tracks.

According to some embodiments, the video grouping module 116 receives a command to ungroup the previously grouped video tracks. In some embodiments, the grouped tracks are identified in the header field as a grouped set of tracks and the grouped tracks are selected to be ungrouped. Once ungrouped, the tracks may be edited by the user. The video grouping module 116 accesses the track information for the grouped tracks. In some embodiments, the track information stored earlier is accessed and the tracks are separated and placed in the timeline based on the track information. The track information will return each track to the place in the timeline where it was located previous to being grouped.

Figure 2:
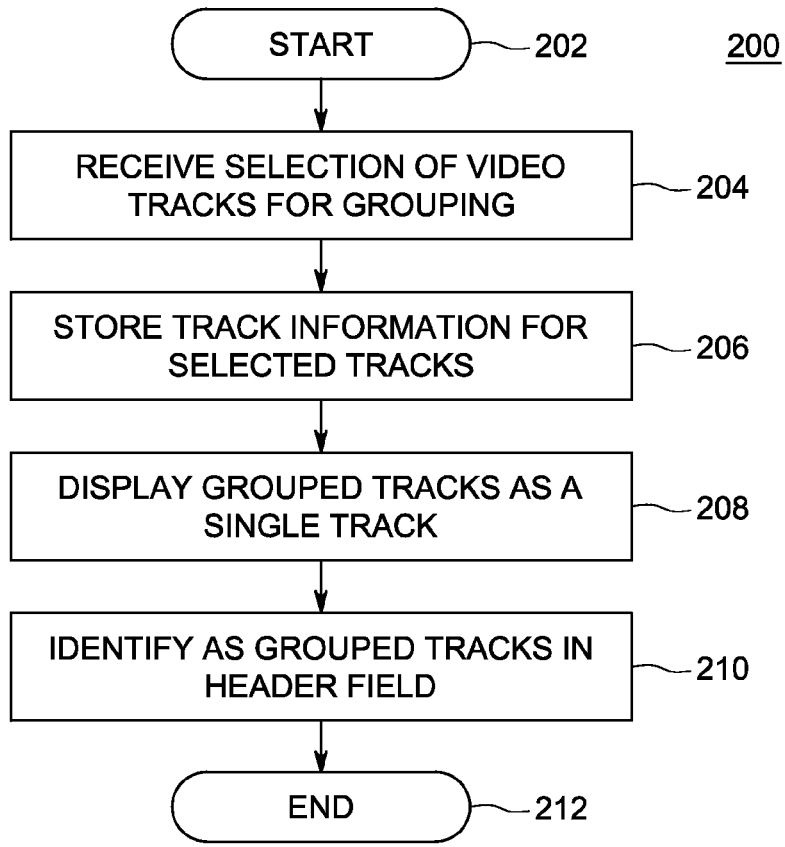
FIG. 2 depicts a flow diagram of a method for grouping multiple video tracks and displaying them as a single track as performed by the video grouping module in FIG. 1, according to one or more embodiments of the invention.

FIG. 2 depicts a flow diagram of a method 200 for grouping multiple video tracks and displaying them as a single track as performed by the video grouping module 116 of FIG. 1, according to an embodiment of the invention. The timeline contains a sequence, which is a collection of audio and video tracks. Each track contains information about the clips it contains e.g., their locations, start and stop times, effects applied, and the like. When a user selects a number of tracks from the user interface (UI), the selection provides indices for the selected tracks. A new sequence, which has the same number of tracks as the selection is created. All clips are retrieved from the selected tracks' information and the clips are cloned. The cloned clips are inserted into the newly created sequence, while maintaining the same relative position of each clip as in the original sequence. This newly created sequence will act as an "embedded sequence", which means the grouped clips are stored as a single clip and placed in the newly created track.

The method 200 starts at step 202, and proceeds to step 204. At step 204, the method 200 receives a selection of video tracks for grouping. When a user is editing multiple video tracks in a timeline, the process becomes difficult when there are tracks the user needs to edit which are not visible on the display while other tracks that are visible on the display are not being edited, and are therefore just taking up space in a display area of the timeline. The user may want any tracks not currently being edited out of the way in order to give the user more workable space in the timeline. The user may select any set of tracks to be grouped. The method 200 proceeds to step 206. At step 206, the method stores track information for each of the selected tracks. In some embodiments, the track information is stored for each selected track and includes whether the track is a video or an audio track. The track information also includes a location i.e., the row in the User-Interface (UI) in which the track was located before the track was grouped. Further, the track information includes an in-point of the track. The above track information is used later when the track is ungrouped to ensure that each video track is paired with the correct audio track and that these tracks are placed correctly in time in the video editing timeline. The method 200 proceeds to step 208.

At step 208, the method displays the grouped tracks as a single track in the video editing timeline. The tracks are essentially layered on top of one another in the single track of the timeline. They are not merged, but the tracks cannot be edited until they are ungrouped and returned to their original location in the video editing timeline. The selected clips and the tracks on which they are located are deleted. A new track is inserted at the location corresponding to the lowest track in the set of tracks to be deleted. The new clip corresponding to the embedded sequence (the grouped tracks) is inserted into the new track. The method 200 proceeds to step 210. At step 210, the method applies an indicator identifying the video tracks as grouped in the video editing timeline so the user knows which track contains the grouped tracks. In some embodiments, a header field is displayed identifying the track as a set of grouped tracks. In some embodiments, a special property is set in the newly created track which will be used to identify it. The method 200 proceeds to step 212 and ends.

Figure 3:
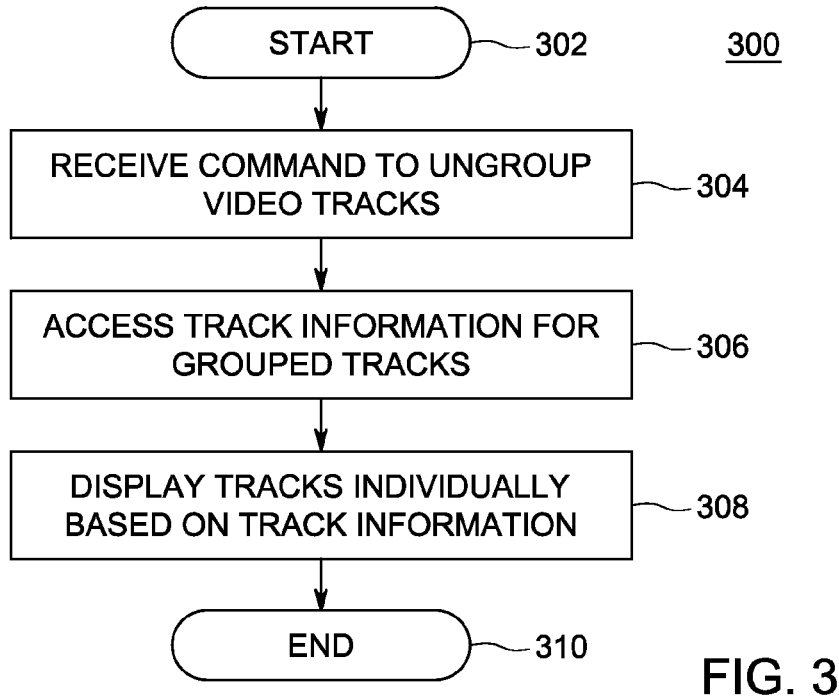
FIG. 3 depicts a flow diagram of a method for ungrouping video tracks as performed by the video grouping module in FIG. 1, according to one or more embodiments of the invention.

FIG. 3 depicts a flow diagram of a method for ungrouping video tracks as performed by the video grouping module 116 in FIG. 1, according to one or more embodiments of the invention. As described above, the track containing the grouped clips has a different UI representation, so the user will know which track can be selected for ungrouping. The track contains the embedded sequence clip, which is the collection of all of the grouped tracks. This provides the corresponding embedded sequence, which contains information about the number of tracks it contains and all information about each clip, including start and stop time, effects, and the like.

The method 300 starts at step 302, and proceeds to step 304. At step 304, the method 300 receives a command to ungroup a set of grouped video tracks. The method 300 proceeds to step 306. At step 306, the method 300 accesses the stored track information for the set of grouped tracks. In some embodiments, the stored track information is accessed by the video grouping module 116 to perform the ungrouping operation. The method 300 proceeds to step 308. At step 308, the method 300 displays the tracks individually, that is, ungrouped, based on the accessed track information. The embedded sequence clip is deleted and new tracks are created corresponding to the tracks in the embedded sequence. A copy of the clips is created from the embedded sequence and the newly created clips are inserted in the newly created corresponding tracks. The method 300 proceeds to step 310 and ends.

Figure 4A:
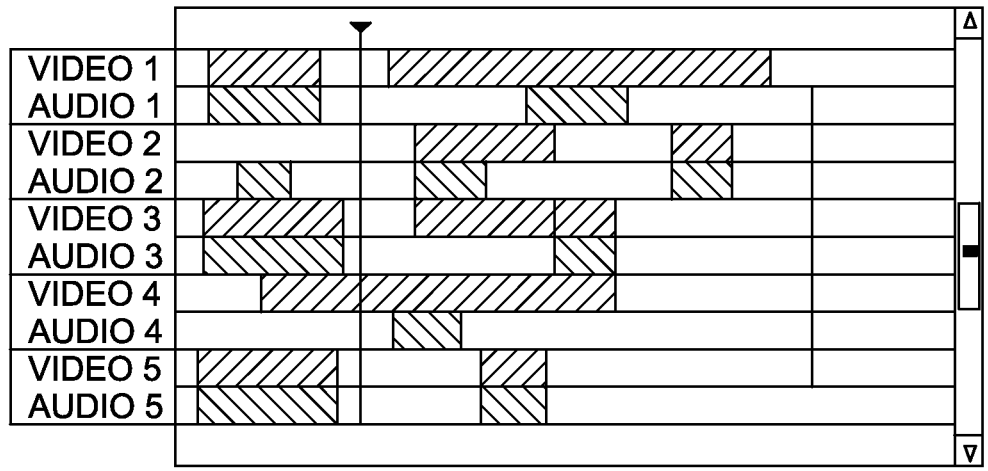
FIG. 4A and FIG. 4B depict a user interface before and after grouping tracks 2, 3, and 4 respectively, according to one or more embodiments of the invention.
Figure 4B:
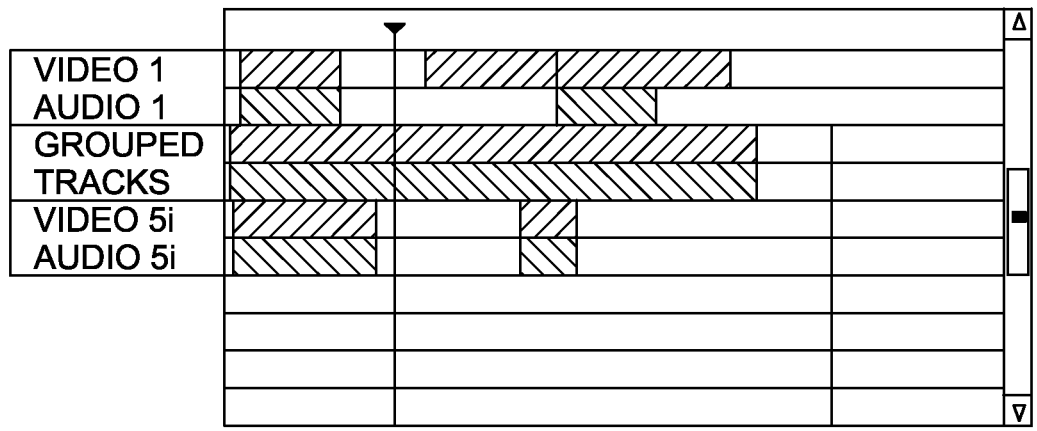

FIGS. 4A and 4B depict a User Interface (UI) before and after grouping of tracks 2, 3, and 4 respectively, according to one or more embodiments of the invention.

As illustrated in FIG. 4A and FIG. 4B, multiple media (audio/video) tracks, such as audio/video 1, audio/video 2. audio/video 5 are displayed on the user interface (UI), in a video editing timeline. Since, due to space constraints of the UI, only 5 pairs of audio/video tracks are visible at a single time, there is no additional space in the UI to see other tracks (such as track 6, 7 and so forth) without scrolling. By grouping one or more tracks (such as audio/video 2, audio/video 3 and audio/video 4) as a single track (shown as "Grouped Tracks" in FIG. 4B), the user is able to have more visible space in the video editing timeline for adding and editing other video clips. In some embodiments, there exists various means for selecting the tracks 2, 3, 4 and grouping the tracks 2, 3, 4 as a single track. When the tracks 2, 3, and 4 are grouped, they take up a single track (but without merging with each other) in the timeline and that single track has a header field identifying it as grouped tracks. Thus, video/audio tracks for track 1 and track 5 remain visible in the UI for editing and space is available for display of two additional video/audio tracks if needed.

Once the editing on track (for example track 1, and track 5) is completed, the grouped track (as shown in FIG. 4B) is selected to be ungrouped. In some embodiments, the video grouping module 116 of FIG. 1 accesses the track information for the grouped tracks (such as audio/video 2, audio/video 3 and audio/video 4). In some embodiments, the track information stored earlier is accessed and the tracks (tracks 2, 3 and 4) are separated and placed back in the timeline based on the track information. The earlier stored track information will return each track (track 2, 3, and 4) to where it was located previous to grouping.

The embodiments of the present invention may be embodied as methods, apparatus, electronic devices, and/or computer program products. Accordingly, the embodiments of the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Example Computer System

Figure 5:
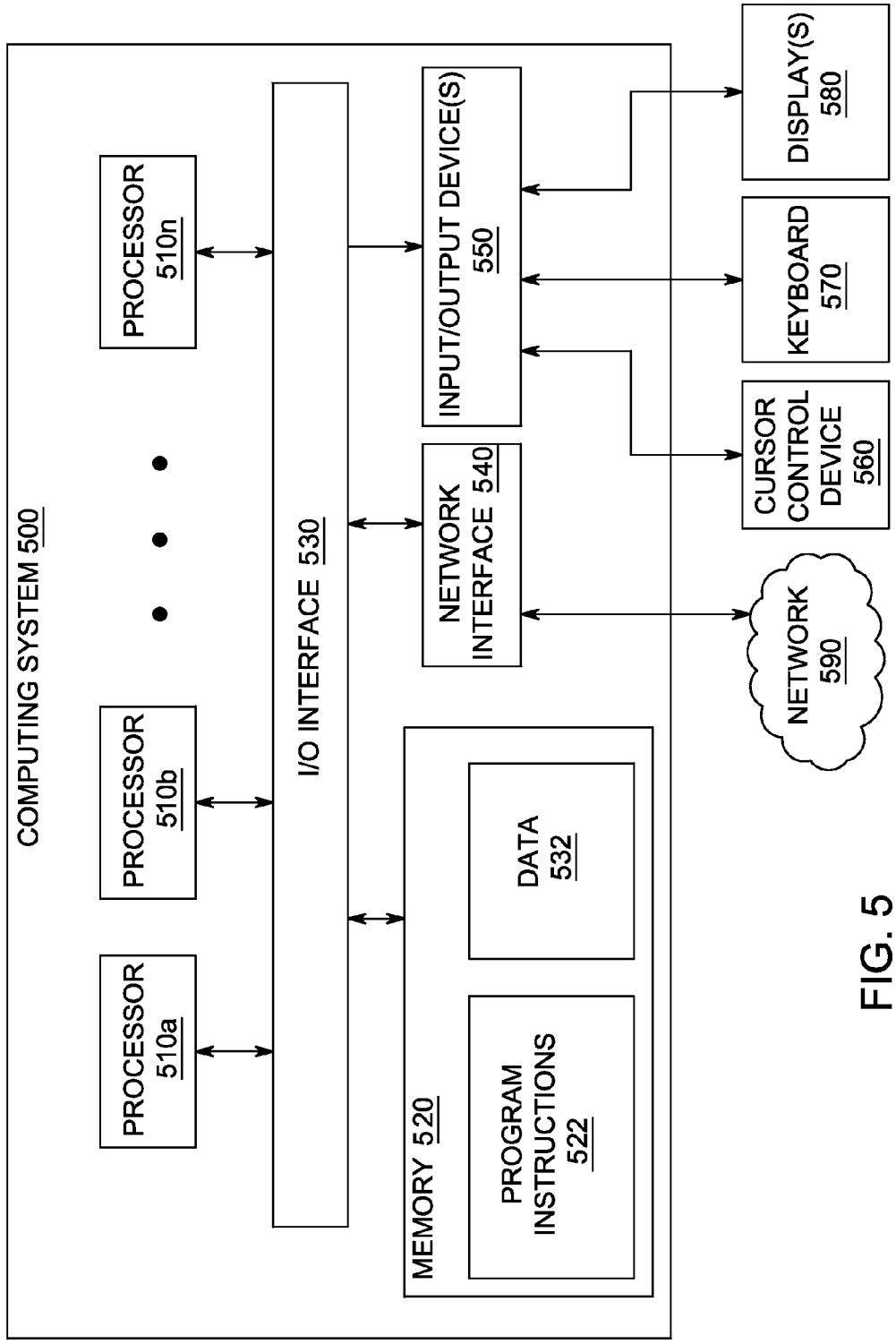
FIG. 5 depicts a computer system that can be utilized in various embodiments of the present invention, according to one or more embodiments of the invention.

FIG. 5 depicts a computer system that can be used to implement the methods of FIG. 2 and FIG. 3 in various embodiments of the present invention, according to one or more embodiments of the invention. FIG. 5 depicts a computer system that can be utilized in various embodiments of the present invention to implement the computer 102, according to one or more embodiments.

Various embodiments of method and apparatus for grouping video tracks in a video editing timeline, as described herein, may be executed on one or more computer systems, which may interact with various other devices. One such computer system is computer system 500 illustrated by FIG. 5, which may in various embodiments implement any of the elements or functionality illustrated in FIGS. 1-3. In various embodiments, computer system 500 may be configured to implement methods described above. The computer system 500 may be used to implement any other system, device, element, functionality or method of the above-described embodiments. In the illustrated embodiments, computer system 500 may be configured to implement methods 200 and 300, as processor-executable executable program instructions 522 (e.g., program instructions executable by processor(s) 510) in various embodiments.

In the illustrated embodiment, computer system 500 includes one or more processors 510 coupled to a system memory 520 via an input/output (I/O) interface 530. Computer system 500 further includes a network interface 540 coupled to I/O interface 530, and one or more input/output devices 550, such as cursor control device 560, keyboard 570, and display(s) 580. In various embodiments, any of components may be utilized by the system to receive user input described above. In various embodiments, a user interface (e.g., user interface) may be generated and displayed on display 580. In some cases, it is contemplated that embodiments may be implemented using a single instance of computer system 500, while in other embodiments multiple such systems, or multiple nodes making up computer system 500, may be configured to host different portions or instances of various embodiments. For example, in one embodiment some elements may be implemented via one or more nodes of computer system 500 that are distinct from those nodes implementing other elements. In another example, multiple nodes may implement computer system 500 in a distributed manner.

In different embodiments, computer system 500 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 500 may be a uniprocessor system including one processor 510, or a multiprocessor system including several processors 510 (e.g., two, four, eight, or another suitable number). Processors 510 may be any suitable processor capable of executing instructions. For example, in various embodiments processors 510 may be general-purpose or embedded processors implementing any of a variety of instruction set architectures (ISAs), such as the x86, PowerPC, SPARC, or MIPS ISAs, or any other suitable ISA. In multiprocessor systems, each of processors 510 may commonly, but not necessarily, implement the same ISA.

System memory 520 may be configured to store program instructions 522 and/or data 532 accessible by processor 510. In various embodiments, system memory 520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 520. In other embodiments, program instructions and/or data may be received, sent or stored upon different types of computer-accessible media or on similar media separate from system memory 520 or computer system 500.

In one embodiment, I/O interface 530 may be configured to coordinate I/O traffic between processor 510, system memory 520, and any peripheral devices in the device, including network interface 540 or other peripheral interfaces, such as input/output devices 550, In some embodiments, I/O interface 530 may perform any necessary protocol, timing or other data transformations to convert data signals from one components (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. Also, in some embodiments some or all of the functionality of I/O interface 530, such as an interface to system memory 520, may be incorporated directly into processor 510.

Network interface 540 may be configured to allow data to be exchanged between computer system 500 and other devices attached to a network (e.g., network 590), such as one or more external systems or between nodes of computer system 500. In various embodiments, network 590 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 540 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 550 may, in some embodiments, include one or more display terminals, keyboards, keypads, touch pads, scanning devices, voice or optical recognition devices, or any other devices suitable for entering or accessing data by one or more computer systems 500. Multiple input/output devices 550 may be present in computer system 500 or may be distributed on various nodes of computer system 500. In some embodiments, similar input/output devices may be separate from computer system 500 and may interact with one or more nodes of computer system 500 through a wired or wireless connection, such as over network interface 540.

In some embodiments, the illustrated computer system may implement any of the methods described above, such as the methods illustrated by the flowchart of FIG. 2 and FIG. 3. In other embodiments, different elements and data may be included.

Those skilled in the art will appreciate that computer system 500 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, etc. Computer system 500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 500 may be transmitted to computer system 500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, etc.), ROM, etc.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method of grouping video tracks in a video editing timeline comprising:
   displaying a plurality of video tracks in a video editing timeline;
   receiving a selection of any two or more video tracks to be grouped from the plurality of video tracks that are displayed, wherein the selection of video tracks is less than all of the plurality of video tracks;
   layering the selected two or more video tracks selected for grouping atop one another;
   displaying the layered video tracks as a new single video track in the video editing timeline, while leaving unchanged the display of those displayed video tracks that were not selected; and
   applying an indicator identifying the display of the new single video track as grouped in the video editing timeline.

2. The method of claim 1, wherein grouping video tracks comprises storing track information for each video track selected for grouping.

3. The method of claim 2, wherein track information comprises a track type, a track location, and an in-point in the video editing timeline.

4. The method of claim 3, wherein a track type is a video track or an audio track.

5. The method of claim 3, wherein the track location defines the track in the editing timeline where the video track was originally displayed.

6. The method of claim 2, further comprising:
   receiving a command to separate a plurality of grouped tracks;
   accessing previously stored track information for each grouped track; and
   displaying the video tracks according to the accessed track information.

7. The method of claim 6, wherein track information comprises a track type, a track location, and an in-point in the video editing timeline.

8. The method of claim 6, wherein displaying the video tracks returns the tracks to a location in the timeline where the track was located before the track was grouped.

9. A non-transitory computer readable medium for storing computer instructions that, when executed by at least one processor cause the at least one processor to perform a method of grouping video tracks in a video editing timeline comprising:
   displaying a plurality of video tracks in a video editing timeline;
   receiving a selection of video tracks from the plurality of video tracks to be grouped;
   layering two or more of the selection of video tracks from the plurality of video tracks to be grouped atop one another;

displaying the video tracks selected for grouping including the layered two or more video tracks as well as the remaining selection of video tracks as a single uneditable horizontal video track in the video editing timeline wherein further selecting to ungroup the single video track causes displaying the selection of video tracks and removing the single video track; and applying an indicator identifying the video tracks as grouped in the video editing timeline.

10. The non-transitory computer readable medium of claim 9, wherein the selection of video tracks is less than all of the plurality of video tracks.

11. The non-transitory computer readable medium of claim 10, further comprising:

creating a new sequence comprising the same number of tracks as the number of the selection of video tracks;

cloning each track of the selection of video tracks; and inserting the cloned clips into the new sequence.

12. The non-transitory computer readable medium of claim 11, further comprising preventing editing of the selection of video tracks when displayed as the single video track.

13. The non-transitory computer readable medium of claim 10, further comprising:

deleting the selection of video tracks from the video editing timeline; and inserting the new track at a location corresponding to the lowest track in the selection of video tracks.

14. The non-transitory computer readable medium of claim 13, further comprising:

receiving a command to separate a plurality of grouped tracks;

accessing previously stored track information for each grouped track; and displaying the video tracks according to the accessed track information, wherein displaying the video tracks returns the tracks to a location in the timeline where the track was located before the track was grouped.

15. A computer implemented method of grouping video tracks in a video editing timeline comprising:

displaying a plurality of video tracks in a video editing timeline; and layering two or more video tracks selected for grouping atop one another, wherein the two or more video tracks selected for grouping are less than all of the plurality of video tracks in the video editing timeline;

displaying, as a new single video track in the video editing timeline, the layered video tracks;

and applying an indicator identifying the display of the new single video track as grouped in the video editing timeline, while leaving unchanged the display of those displayed video tracks that were not selected.

16. The method of claim 15, further comprising gathering track information.

17. The method of claim 16, wherein the track information comprises a track type, a track location, and an in-point in the video editing timeline.

18. The method of claim 17, wherein the track type is a video track or an audio track.

19. The method of claim 15, further comprising, in response to a request to ungroup video tracks, accessing previously gathered track information for each grouped track; and displaying the video tracks according to the accessed track information.

20. The method of claim 19, wherein displaying the video tracks returns the tracks to a location in the timeline where the track was located before the track was grouped.

\* \* \* \* \*